United States Patent Office 3,783,001
Patented Jan. 1, 1974

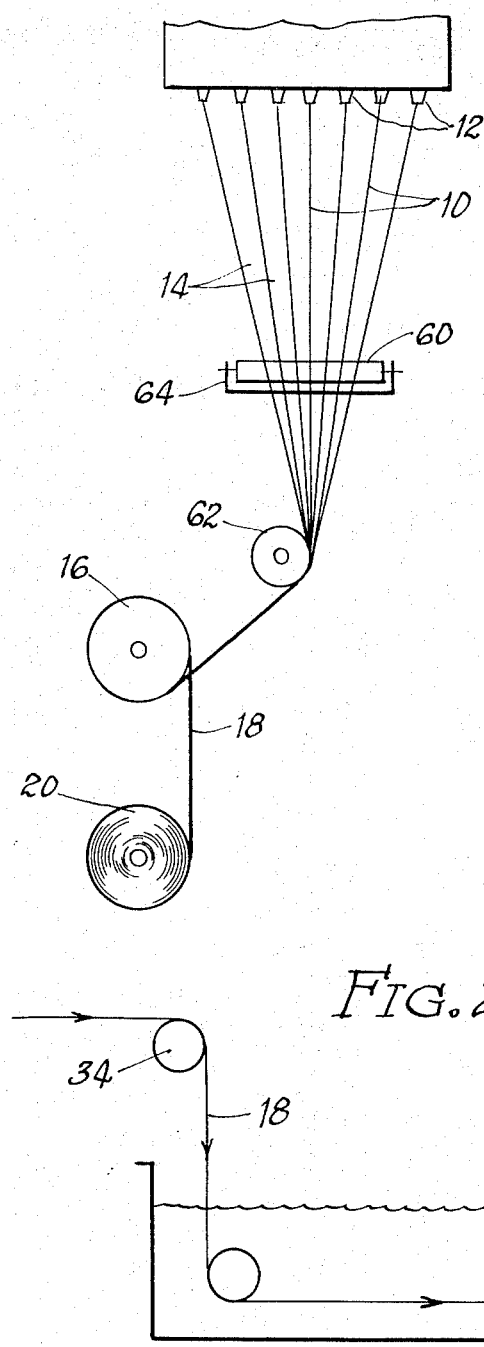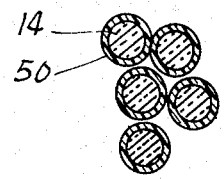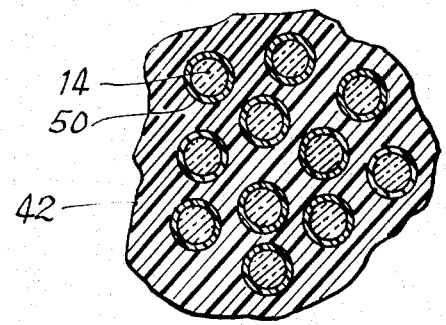

3,783,001
TREATED GLASS FIBERS FOR GLASS FIBER-ELASTOMERIC PRODUCTS AND METHOD
Alfred Marzocchi, Cumberland, R.I., assignor to Owens-Corning Fiberglas Corporation
Filed Jan. 11, 1971, Ser. No. 105,199
Int. Cl. B32b 25/02, 25/14, 17/10
U.S. Cl. 117—72
21 Claims

ABSTRACT OF THE DISCLOSURE

This invention is addressed to the treatment of glass fibers to improve the bonding relationship between the glass fibers and elastomeric materials when the glass fibers are combined with elastomeric materials in the manufacture of glass fiber-reinforced elastomeric products wherein glass fibers are first treated with a hot melt of an elastomer, a resin or mixtures thereof, preferably while the glass fibers are in a nascent state, to provide a thin coating on the individual glass fibers, and a bundle formed of the thus treated glass fibers is thereafter impregnated with an elastomer compatible material to provide a glass fiber bundle in which the individual fibers have a thin coating on the surfaces thereof formed from the hot melt, and an impregnant contained in the glass fiber bundle.

---

This invention relates to elastomeric products reinforced or otherwise combined with glass fibers and it relates more particularly to the method and compositions employed in the treatment of the glass fibers to enhance the bonding relationship between the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a silver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like, elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of the invention to provide a new and improved method for treating glass fibers in forming, or afterwards, to enable fuller utilization to be made of the desirable characteristics of the glass fiber when used in combination with elastomeric materials in the manufacture of glass fiber-reinforced molded products and coated fabrics.

More specifically, it is an object of the invention to provide a method for the treatment of glass fibers to improve the processing and performance characteristics of the glass fibers as a reinforcement for elastomeric materials in the form of yarns, cords, strands or fabrics, hereinafter referred to as bundles, to enhance their bonding relationship when used in combination with elastomeric materials in the manufacture of glass fiber-reinforced plastics, laminates or coated fabrics, such as pneumatic tires, belts and the like.

These and other objects and advantages of the invention will appear hereinafter, and, for purposes of illustration, but not of limitation, an embodiment of the invention is shown in the accompanying drawing wherein:

FIG. 1 is a schematically elevated view of an arrangement of elements for coating of glass fibers in accordance with the practice of this invention;

FIG. 2 is a flow diagram illustrating the treatment of glass fibers subsequent to their being formed into bundles to impregnate the glass fibers in accordance with the practice of the invention;

FIG. 3 is a cross-sectional view of a glass fiber strand treated in accordance with the diagram of FIG. 1, and, FIG. 4 is a cross-sectional view of a bundle of glass fibers processed in accordance with the flow diagram of FIG. 2.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In my copending application, Ser. No. 602,241, filed Dec. 16, 1966, now abandoned, and entitled, "Treated Glass Fibers for Glass Fiber-Elastomeric Products and Method," description is made of a method for treating glass fibers to enhance the bonding relationship between glass fibers and elastomeric materials in the manufacture of glass fiber-reinforced elastomeric products, wherein the individual glass fibers are first coated with a hot melt containing an elastomer or a resin as the glass fibers are formed, while the glass fibers are still in their nascent or more reactive state. An important concept of the aforesaid application resides in the realization of the fact that the surfaces of the glass fibers contain hydrophilic groups which promote the formation of a tenacious film on the glass fiber surfaces immediately after the glass fibers are formed. By coating the individual glass fibers in forming, the elastomer or resin in the form of a hot melt becomes bonded to the glass fiber surfaces before the moisture film can form, with the result that a much stronger bond between the surfaces of the glass fibers and the elastomer or resin coating is made possible.

In addition, the use of an elastomer or resin for treatment of glass fibers in the form of a hot melt provides the further advantage that it enables greater amounts of the elastomer or resin to be incorporated into the coating for fuller utilization of the glass fibers as a reinforcement or strengthening agent in glass fiber-reinforced elastomeric products.

The present invention is addressed to a method for treatment of glass fibers to enhance the bonding relationship between the glass fibers and elastomeric material in the manufacture of glass fiber reinforced elastomeric products wherein glass fibers are treated with a hot melt of an elastomer or a resin to form a thin coating of the elastomer or resin on the surfaces thereof. Thereafter, a bundle of the glass fibers is impregnated with an elastomer compatible impregnant whereby the impregnant in the glass fiber bundle operates to further intertie the glass fibers to elastomeric materials when the glass fibers are combined with elastomeric materials in the manufacture of glass fiber-reinforced elastomeric products.

It will be understood that, in accordance with the practice of the present invention, the hot melt may be applied to the individual glass fibers to form a thin coating thereon subsequent to their forming after an orginally applied size coating has been removed, but the hot melts are preferably applied to the glass fibers in forming before the moisture film described above can be formed. It is generally sufficient that the hot melt be applied in an amount to deposit a monomolecular layer of the elastomer or resin on the glass fiber surface. For maximum loading, it is preferred that the coating on the glass fiber surfaces have a thickness within the range of 0.25-2.0 mils, or constitute 2-20% by weight of the coated glass fibers, and preferably 5-12% by weight.

The following examples will illustrate the principal concepts of the invention.

EXAMPLE 1

Glass fibers treated in accordance with the present invention are formed by rapid attenuation of molten strands of glass in a conventional manner. Referring specifically to FIG. 1, the continuous fibers are formed by the rapid attenuation of the molten streams 10 of glass issuing from a plurality of ports 12 in the bottom side of a glass melting bushing. Attenuation or stretching of the molten streams of glass into filament 14 is achieved by rapidly rotating gathering wheel 62 about which the gathered bundle of glass fiber filaments are wound, and the formed strand 18 is fed by the puller wheel to a siding spool 20 about which the formed glass fiber strand is wound. A pulley 16 is used to relieve the tension otherwise existing when the strand is rewound directly on the spool whereby the coating applied to the glass fiber would be squeezed out from the glass fiber bundle so that the strand would be difficult to unwind from the spool.

In accordance with the practice of this invention, neoprene is reduced to a hot melt at a temperature within the range of 280–330° F., and is applied directly onto the glass fiber surfaces by means of a heated transfer roller 60 over which the plurality of fibers are drawn prior to their being gathered together at the gathering roller 62 to form the glass fiber strand or yarn. In the preferred practice, the heated transfer roller 60 is located sufficiently close to the bushing so that the filaments are still hot at the time the coating is applied.

The heated transfer roller 60, which is preferably heated to the temperature of the hot melt, is supplied with a thin layer of the elastomer on its peripheral surface, either by a series of feed rolls for transmission of the hot melt elastomer, by transmission of thin films of the elasotmer onto the feed rolls, or, the roll 60 may have a portion of its periphery immersed in a bath 64 of the molten elastomer to take up the desired amount of the elastomer on the roll surface. The amount of the elastomer taken up by roll 60 and applied as a coating 50 to the surfaces of the glass fibers 14 (see FIG. 3) can be varied in a variety of ways, such as by controlling the viscosity of the hot melt by way of temperature or plasticizer and/or by the amount of relative movement between the fibers and the peripheral speed of the roll applicator whereby the molten elastomer is applied to the fiber surfaces.

Thereafter, the strand of coated glass fibers is impregnated with the following impregnant composition:

|  | Percent by weight |
| --- | --- |
| Natural rubber latex-Resorcinol Formaldehyde Resin (38% solids—"Lotol 5440") | 30.0 |
| Water | 70.0 |

Impregnation with the aqueous composition may be made by conventional means for impregnation, such as by immersion of the bundles of glass fibers in a bath of the impregnant composition. Referring more specifically to FIG. 2 of the drawing, the glass fiber bundle 32 is advanced over a guide roller 34 for passage downwardly into bath 35 containing the impregnating composition of Example 4. The bundle is then turned under rollers 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter, the endless bundle is advanced over the roller 39 into a drying oven preferably in the form of an air drying oven 40 maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1-30 minutes, depending somewhat upon the temperature of drying.

Suitable resorcinol aldehyde resins and combinations thereof with natural rubber latex are marketed by the U.S. Rubber Company under the trade name "Lotol 5440." For the preparation of such materials, reference can be made to Canadian Pat. No. 435,754, wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

The resulting impregnated glass fiber bundle is shown in FIG. 4, and generally comprises a plurality of glass fibers 14, each of which have the thin coating 50 of the elastomer on the surfaces thereof. The coated glass fibers are held together in a spaced relationship by means of the impregnant 42 which completely penetrates the glass fiber bundle.

It will be understood that a wide variety of methods for applying the hot melt may be used in lieu of the method described in Example 1. For example, it is possible to apply the hot melt on the glass fibers as they are formed in accordance with the method described in my aforesaid copending application. It will also be understood that the hot melt need not be, although it preferably is, applied to the glass fibers as they are formed. For example, it is possible to apply the hot melt to the individual glass fibers after a previously applied size has been removed, such as by heating the sized glass fiber to a temperature within the range of 900–1100° F.

Various other examples of this concept of the invention are as follows.

EXAMPLE 2

In this example, a strand of glass fibers, from which an originally applied size has been removed, are coated with a hot melt of polyisoprene maintained in a liquid state at a temperature within the range of 250–300° F. Application of the polyisoprene hot melt may be made by the method described in Example 1. Thereafter, the strand of glass fibers is an impregnant with the following impregnating composition.

| | Percent by weight |
|---|---|
| Natural rubber latex-Resorcinol Formaldehyde Resin (38% solids—"Lotol 5440") | 28.0 |
| Water | 72.0 |

It will be understood that a wide variety of other elastomer compatible impregnants may be used in place of the RFL exemplified in Examples 1 and 2. For example, use may be made of a vinyl-pyridine-butadiene-styrene terpolymer latex of the type described in U.S. Pat. No. 3,424,608, which is commercially available under the trademark "Gentac" from the General Tire and Chemical Company or under the trademark of "Pliolite" by the Goodyear Chemical Company. The use of this elastomer compatible impregnant may be illustrated by the following example.

EXAMPLE 3

A hot melt of chlorobutyl rubber is maintained within the range of 250–350° F. and is applied to glass fiber surfaces in forming in accordance with the method described in Example 1.

Thereafter, the glass fiber strand is impregnated with the following impregnating composition.

| | Percent by weight |
|---|---|
| Vinyl-pyridine-butadiene styrene terpolymer (41% solids—"Gentac") | 25.0 |
| Water | 75.0 |

Application of the foregoing impregnant composition is made to deposit dry solids constituting 2–20% by weight of the glass fiber system.

Another elastomer compatible impregnant composition which may be employed in the practice of the present invention is the impregnant composition described in U.S. Pat. No. 3,424,608; the use of this impregnant composition may be illustrated by the following example.

EXAMPLE 4

A hot melt of polyacrylonitrile rubber is maintained at a temperature within the range of 250–350° F., and is applied to glass fibers in forming in accordance with the method described in Example 1.

Thereafter, a bundle of the thus coated glass fiber is impregnated with the following impregnant composition.

| | Parts by weight |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene lates (60% solids) | 5–15 |
| Alkali metal hydroxide | .05–0.2 |

Water is incorporated with the foregoing materials in amounts to produce an impregnating composition having a minimum solids content of 10% and a maximum solids content of about 50% by weight. Introduction should be made in an amount to impregnate with a dry solids of 2–20% by weight of the glass fiber system.

It will be appreciated that the elastomers used in accordance with the practice of the present invention are those which are capable of forming a stable hot melt. It is possible to render various elastomeric material more fluid by the impregnation of a plasticizer in the hot melt of the elastomer wherein the plasticizer is of the fugitive type capable of being substantially completely eliminated from the coating after application to the glass fiber surfaces. For this purpose, use can be made of a plasticizing system, such as the conventional "Circosol" types of oils or carboxylated styrene-butadiene circosol which produces flowable systems. The fugitive plasticizer should have a boiling temperature above the temperature of the hot melt so as to enable the formulation of a stable hot melt composition, but one in which the plasticizer component can be removed from the thin coating 50 on the glass fiber surfaces when the coated glass fibers are heated to an elevated temperature. This concept of the present invention may be represented by the following example.

EXAMPLE 5

Polyisoprene is plasticized with 20–50% by weight kerosene, and is applied to glass fibers as they are formed in the form of a hot melt maintained at a temperature within the range of 250–350° F. The temperature of the hot melt is below the boiling temperature of kerosene so that a stable hot melt is provided. The glass fibers coated with the thin layer of the plasticized elastomer are thereafter heated to a temperature above the boiling point of kerosene whereby the kerosene in the thin film coating on the glass fiber surfaces is flashed off from the coating to leave the unplasticized elastomer as a residue on the glass fiber surfaces. Heating to flash off the fugitive plasticizer can be effected by advancing the coated glass fibers over a hot roller which is maintained at a temperature of 300–350° F., or by advancing the coated fibers through a heated zone with a high velocity air stream maintained at a temperature of 250–350° F.

It is possible, and frequently preferred, to employ a hot melt of a resin in lieu of the elastomer hot melts utilized in Examples 1–5, particularly where a glass fiber bundle having increased stiffness is desired. Suitable resins include polyesters, polyamides, polyepoxides, resorcinol aldehyde resins, polyurethane resins and mixtures thereof, as well as a wide variety of others known to those skilled in the art. It will be understood that plasticizers may similarly be used in conjunction with the foregoing resins. This concept may be illustrated by the following examples.

EXAMPLE 6

A hot melt of a polyamide formed of maleic acid and hexamethylene diamine is applied to glass fibers as they are formed in accordance with the method described in Example 1. Thereafter, a bundle of the coated glass fibers is impregnated with the resorcinol aldehyde latex impregnant composition exemplified in Example 1.

EXAMPLE 7

A hot melt of a polyepoxide is applied to glass fibers from which an originally applied size coating has been removed by means of a roller applicator which is constantly wetted with the polyepoxide hot melt.

Thereafter, the coated glass fibers in the form of a bundle are impregnated with the impregnant composition utilized in Example 3.

EXAMPLE 8

A hot melt comprising 75% by weight of a polyamide resin and 25% by weight of a resorcinol formaldehyde resin is applied to a strand of glass fiber in accordance with the method in Example 1 to individually coat the glass fibers with the hot melt. Thereafter, the glass fibers in the form of a bundle are impregnated with the resorcinol formaldehyde latex impregnant composition utilized in Example 1.

EXAMPLE 9

A polyester formed of maleic acid and propylene glycol is applied to a strand of glass fiber as they are formed in accordance with the method of Example 1. Thereafter, the resulting strand is impregnated with one of the impregnant compositions described in Examples 2–4.

EXAMPLE 10

A hot melt is formed of 75% by weight of the polyester described in Example 9 and 25% by weight of a polyurethane resin. This hot melt is applied to a glass fiber strand in accordance with the method of Example 1, and the resulting coated glass fiber may then be impregnated with one of the impregnant compositions described in Examples 2–4.

It will be understood that a wide variety of polyesters and polyamides may be used in lieu of the polyester and polyamide described above. The polyester resins contemplated for use in the present invention are those formed by the reaction of a polybasic acid or its anhydride, such as phthalic anhydride, maleic acid, fumaric acid and the like with a polyhydric alcohol such as glycerin glycol and the like. Similarly, suitable polyamides are those formed by the reaction of one or more of the foregoing polybasic acids with a plyamine, such as an alkylene diamine. When a mixture of two or more of the foregoing resins are used in combination, the proportion of the relative amounts of each resin is not critical and may be varied within wide ranges, depending somewhat upon the properties desired of the final impregnated glass fiber bundle.

It will be appreciated that the stiffness of the glass fiber bundle prepared in accordance with this concept of the invention may be conveniently varied by use of a hot melt comprising a mixture of one or more of the foregoing resins and one or more of the elastomers described above, wherein the elastomer content of the hot melt may be varied within the range of 1–50% by weight. This concept of the present invention may be illustrated by the following examples wherein a hot melt is formulated as follows.

EXAMPLE 11

| | Percent by weight |
|---|---|
| Polyamide | 80.0 |
| Neoprene rubber | 20.0 |

EXAMPLE 12

| | Percent by weight |
|---|---|
| Polyester | 90.0 |
| Polyisoprene rubber | 10.0 |

EXAMPLE 13

| | Percent by weight |
|---|---|
| Polyepoxide | 85.0 |
| Chlorobutyl rubber | 15.0 |

Hot melts of the foregoing compositions may be applied to glass fibers as they are formed in accordance with the method in Example 1. Thereafter, the coated fiber is treated in the form of a bundle with an impregnant composition of the type described in Examples 2–4.

One system which is particularly advantageous in accordance with the present invention are those in which the hot melt is formulated to include an elastomer and 25% to 75% by weight of a hydroxyl terminated resin based upon butadiene. Such resins are commercially available from Atlantic-Richfield under the designation "Poly B–D" resins. For example, use can be made of hydroxyl terminated butadiene homopolymers (Poly B–D R–15 M or R 45M), hydroxy terminated butadiene-styrene copolymers (Poly B–D CS–15) or hydroxy terminated butadiene-acrylonitrile copolymers (Poly B–D CN15).

One of the chief advantages of systems of the type described above is that the hydroxyl terminated Poly B–D resins are capable of reaction with polyamides and for polyester resins containing free carboxyl groups as well as polyurethane prepolymers containing free isocyanate groups, and are capable of cure and for vulcanization with elastomers.

Thus, the foregoing polyester, polyamide and isocyanate systems are particularly useful as the impregnant in glass fiber bundles in which the glass fibers have been treated with a hot melt formulated to contain the hydroxyl terminated polymers described. However, other impregnating compositions of the types described in Examples 1 to 13 may also be used with bundles in which the fibers have been coated with such hot melts.

This concept of the invention may be illustrated by the following examples.

EXAMPLE 14

A hot melt composition is formulated as follows:

| | Percent by weight |
|---|---|
| Neoprene rubber | 50 |
| Hydroxy terminated polybutadiene (Poly B–D R 15–M) (Hydroxyl number 42) | 50 |

The foregoing hot melt composition is applied to glass fibers in the manner described in Example 1.

Thereafter, the glass fibers coated with the hot melt are formed into a bundle, and the bundle is impregnated with a polyurethane prepolymer containing free isocyanate groups prepared by reacting 3 moles of toluene diisocyanate with 1 mole of propylene glycol in accordance with the procedure described in Example 1.

The resulting impregnated bundle may be cured and/or vulcanized after impregnation to cause the neoprene rubber to react with the butadiene homopolymer and the polyurethane prepolymer containing the free isocyanate groups to react with the hydroxyl groups on the butadiene polymer. Alternatively, cure and/or vulcanization can be effected after the impregnated bundle is combined with an elastomeric material during the manufacture of glass fiber reinforced elastomeric products.

EXAMPLE 15

A hot melt composition is formulated as follows:

| | Percent by weight |
|---|---|
| Chlorobutyl rubber | 30 |
| Hydroxyl-terminated butadiene-acrylonitrile copolymer (Poly B–D CN–15) (Hydroxyl number 39) | 70 |

The foregoing hot melt is applied to glass fibers in accordance with the procedure described in Example 14. Thereafter, the coated fibers are formed into a bundle which is impregnated with a polyester composition prepared by reacting maleic acid with butylene glycol in a mole ratio of 2:1.

EXAMPLE 16

A hot melt composition as follows:

| | Percent by weight |
|---|---|
| Polyisoprene rubber | 40 |
| Hydroxyl terminated butadiene-styrene copolymer (Poly B–D CS–15) | 60 |

Glass fibers are coated as they are formed with the foregoing composition, and are thereafter formed into a bundle which is impregnated with resorcinol formaldehyde latex impregnant of Example 2.

In accordance with a further concept of the present invention, either the hot melt or the impregnant composition, or both, may be formulated to contain an additive which operates to further enhance the bonding relationship between the glass fiber surfaces of the elastomeric materials when the treated glass fibers are combined with elastomeric materials in the manufacture of reinforced elastomeric products. For example, use may be made of a cross linking agent, such as allyl cyanurate which operates to cross link the elastomer, resin or elastomer compatible material and/or a glass fiber anchoring agent, such as gamma-aminopropyl-triethoxy silane, which have been formulated into either the hot melt, or the impregnant composition or both.

Instead of gamma-aminopropyltriethoxy silane, in the hot melt or in the impregnating composition, use can be made of other organo silicon compounds in which the organic group attached to the silicon atom contains an amino group, such as gamma-aminovinyldiethoxy silane, gamma(triethoxysilylpropylamide) propylamine, N-(gamma-triethoxysilylpropyl) propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylato chromic chloride.

This concept of the invention may be illustrated by reference to the examples of hot melt and impregnant compositions which may be applied to glass fibers in accordance with the method described in Example 1.

EXAMPLE 17

Hot melt composition

| | Percent by weight |
|---|---|
| Neoprene rubber | 99.0 |
| Allyl cyanurate | 1.0 |

Glass fibers coated with the above hot melt may thereafter be impregnated with an elastomer compatible impregnant of the type described in Examples 2-4.

EXAMPLE 18

Hot melt composition

| | Percent by weight |
|---|---|
| Neoprene rubber | 99.0 |
| Gamma-aminopropyltrimethoxy silane | 1.0 |

A strand of glass fibers treated with the foregoing hot melt may thereafter be impregnated with the following impregnant composition.

| | Percent by weight |
|---|---|
| Natural rubber latex | 25.0 |
| Gamma-aminopropyltrimethoxy silane | 1.0 |
| Water | 74.0 |

EXAMPLE 19

Glass fibers are first treated with a hot melt of isoprene rubber, and are thereafter treated with the following impregnant composition.

| | Percent by weight |
|---|---|
| Vinyl pyridine-butadiene-styrene terpolymer latex | 30.0 |
| Gamma-aminopropyltrimethoxy silane | 1.0 |
| Water | 69.0 |

In accordance with this concept of the invention, the anchoring agent is employed in an amount within the range of 0.1-3% by weight of the hot melt and impregnant composition, and preferably within the range of 0.1-1.0% by weight. The allyl cyanurate can be employed in an amount corresponding to between 0.1 and 10% by weight of the hot melt or the impregnant compositions.

EXAMPLE 20

Hot melt composition

| | Percent by weight |
|---|---|
| Polyamide resin | 98.0 |
| Allyl cyanurate | 2.0 |

A glass fiber bundle formed of glass fibers which have been treated with the foregoing hot melt may then be impregnated with an elastomer compatible impregnant composition of the type described in Examples 2-4.

EXAMPLE 21

Hot melt composition

| | Percent by weight |
|---|---|
| Polyester resin | 98.5 |
| Methacrylato chromic chloride | 1.5 |

A bundle of glass fibers treated with the foregoing hot melt composition may then be impregnated with an elastomer compatible impregnant of the type described in Examples 2-4.

EXAMPLE 22

A glass fiber bundle in which the individual glass fibers have been coated with a hot melt comprising a polyepoxide is impregnated with the following impregnant composition.

| | Percent by weight |
|---|---|
| Natural rubber latex-Resorcinol Formaldehyde Resin (38% solids-"Lotol 5440") | 35.0 |
| Glycidoxypropyltrimethoxy silane | 1.5 |
| Water | 63.5 |

EXAMPLE 23

Hot melt composition

| | Percent by weight |
|---|---|
| Polyamide resin | 80.0 |
| Allyl cyanurate | 1.0 |
| Neoprene rubber | 19.0 |

A glass fiber bundle in which the individual fibers have been treated with the above hot melt composition may then be impregnated with an elastomer compatible impregnant of the type described in Examples 2-4.

EXAMPLE 24

Hot melt composition

| | Percent by weight |
|---|---|
| Polyamide resin | 70.0 |
| Isoprene rubber | 29.0 |
| Glycidoxypropyltriethoxy silane | 1.0 |

A glass fiber bundle in which the individual fibers have been treated with the foregoing hot melt composition are then impregnated with an elastomer compatible impregnant of the type described in Example 4.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomiric material with which the glass fibers are combined will constitute a continuous phase. Such continuous phase of elastomeric material may comprise rubbers of the type incorporated into the impregnating composition or the elastomeric material can differ therefrom. The continuous phase of elastomiric material can be employed in the cured or uncured state or in the vulcanized or unvulcanized state. It is believed that the tie-in between the impregnated bundles of glass fibers and the elastomeric material forming the continuous phase will occur primarily during cure of vulcanization of the elastomeric material during the fabrication of the elastomeric material.

Glass fiber bundles prepared in accordince with the concepts of the present invention may be partially cured and combined with elastomeric materials for complete cure during vulcanization. In either case, glass fiber the glass fiber bundle in an uncured state for complete cured during vulcanization. In either case, glass fiber bundles processed in accordance with the present invention exhibit a heretofore unknown adhesion to elastomeric materials. In fabricating the combinations of the glass fibers treated in accordance with the present invention with elastomeric materials, the bundles of glass fiber are mixed with elastomeric material are otherwise laid down in the desired arrangement for combination with the elastomeric material as in the manufacture of glass fiber-reinforced belts or in the manufacture of rubber tires reinforced with cords of glass fiber. The combination of glass fiber and elastomeric material is processed in a conventional manner by molding or curing under heat and compression or by vulcanization for advancement of the elastomeric material to a cured or vulcanized stage while in combination with the treated glass fibers whereby the bundles of glass fibers become strongly integrated with the elastomeric material in the glass fiber-reinforced elastomeric product.

It will be apparent that I have provided a new and improved method for use in the treatment of glass fibers and bundles of glass fibers to enhance their integration with elastomeric material in the manufacture of glass fiber-reinforced products.

It will be understood that invention exists not only in the method for use in the treatment of glass fibers and bundles of glass fibers, but that invention also exists in the treated glass fiber bundle formed as a result of the method.

It will be understood that various changes and modifications may be made in the details of formulation and method of application without departing from the spirit of the invention, especially as defined in the following claims.

What is claimed is:

1. A glass fiber bundle comprising a plurality of glass fibers, said glass fibers containing a thin coating thereon comprising a mixture of an elastomer and a hydroxy terminated polymer resin based on butadiene, in which the resin constitutes between 25 and 75% by weight of the mixture, which has been deposited on the glass fiber surfaces by treating the glass fibers with a hot melt of said mixture, and an impregnant in said bundle, said impregnant comprising an elastomer compatible material.

2. A glass fiber bundle as defined in claim 1 wherein said thin coating has a thickness within the range of 0.25 to 2.5 mils.

3. A glass fiber bundle as defined in claim 1 wherein said coating constitutes 2–20% by weight of said glass fibers of said bundle.

4. A glass fiber bundle as defined in claim 1 wherein said impregnant is present in an amount within the range of 2–20% by weight of said glass fiber bundle.

5. A glass fiber bundle as defined in claim 1 wherein said elastomer compatible material is a resorcinol aldehyde latex.

6. A glass fiber bundle as defined in claim 1 wherein said elastomer compatible material is a vinyl pyridine-butadiene-styrene terpolymer.

7. A glass fiber bundle as defined in claim 1 wherein said polymeric material has been deposited on the glass fibers as they are formed.

8. A glass fiber bundle as defined in claim 1 wherein said impregnant includes allyl cyanurate.

9. A glass fiber bundle as defined in claim 1 wherein said polymeric material includes allyl cyanurate.

10. A glass fiber bundle as defined in claim 1 wherein said polymeric material includes an anchoring agent.

11. A glass fiber bundle as defined in claim 1 wherein said impregnant includes an anchoring agent.

12. A glass fiber bundle as defined in claim 1 wherein the elastomer compatible material is selected from the group consisting of polyamides and polyesters containing free carboxyl groups and polyurethanes containing free isocyanate groups.

13. A glass fiber bundle as defined in claim 1 wherein said polymer resin is selected from the group consisting of hydroxy terminated butadiene homopolymers, hydroxy terminated copolymers of butadiene and styrene and hydroxy terminated copolymers of butadiene and acrylonitrile.

14. A glass fiber bundle as defined in claim 1 wherein the bundle is formed of strands of fibers which have been plied and twisted together.

15. In a glass fiber reinforced elastomeric product in which an elastomeric material constitutes a continuous phase in which bundles of glass fibers are distributed, the improvement in the bonding relationship of the glass fibers in the bundle to the elastomeric material comprising a bundle formed of a plurality of glass fibers, said glass fibers containing a thin coating thereon comprising a mixture of an elastomer and an hydroxy terminated polymer resin based on butadiene, in which the resin constitutes between 25 to 75% by weight of the mixture, which has been deposited on the glass fiber surfaces by treating the glass fibers with a hot melt of said mixture, and an impregnant in said bundle, said impregnant comprising an elastomer compatible material.

16. A product as defined in claim 15 wherein said thin coating has a thickness within the range of 0.25 to 2.5 mils.

17. A product as defined in claim 15 wherein said coating constitutes 2–20% by weight of said glass fibers of said bundle.

18. A product as defined in claim 15 wherein said impregnant is present in an amount within the range of 2–20% by weight of said glass fiber bundle.

19. A product as defined in claim 15 wherein said polymeric material has been deposited on the glass fibers as they are formed.

20. A product as defined in claim 15 wherein said polymeric material includes an anchoring agent.

21. A product as defined in claim 15 wherein the elastomer compatible material is selected from the group consisting of polyamides and polyesters containing free carboxyl groups and polyurethanes containing free isocyanate groups.

References Cited

UNITED STATES PATENTS

| | | | |
|---|---|---|---|
| 2,671,744 | 3/1954 | Biefeld et al. | 117—126 GB |
| 3,323,975 | 6/1967 | Marzocchi et al. | 117—126 GB |
| 3,402,064 | 9/1968 | Marzocchi | 117—126 GB |
| 3,413,186 | 11/1968 | Marzocchi | 117—126 GB |
| 3,620,701 | 11/1971 | Janetos et al. | 117—72 |

WILLIAM D. MARTIN, Primary Examiner

W. H. SCHMIDT, Assistant Examiner

U.S. Cl. X.R.

65—3; 117—126 GB